United States Patent Office 2,810,162
Patented Oct. 22, 1957

2,810,162

PROCESS FOR PREPARING SHAPED ARTICLES OF CELLULOSE

Max Fredrick Bechtold, Kennett Square, Pa., and James Herbert Werntz, Wilmington, Del., assignors to E. I. du Pont de Nemours & Company, Wilmington, Del., a corporation of Delaware No Drawing. Application June 11, 1953, Serial No. 361,064

6 Claims. (Cl. 18—55)

This invention relates to shaped articles of cellulose such as films, filaments and the like and, more particularly, to a process of preparing such articles.

The conversion of cellulose into tough, thin films and fine filaments has involved, heretofore, the preparation of solutions of the polymer, or of derivatives thereof, and the subsequent separate step of forming such solutions into the desired shapes. As carried out heretofore, such procedures have been limited by the fact that excessively high viscosity has prevented or made impractical the preparation and handling of solutions that are both high in polymer content and high in the molecular weight of the contained polymer.

Attempts to lower the viscosity of cellulose solutions and speed the dissolving of the cellulose through the use of heat have heretofore caused material polymer degradation. Nevertheless, for the lack of a better method, one of these processes, the viscose process, has achieved great commercial success even though it involves chemical modification and degradation of the cellulose, as well as the dissipation of auxiliary chemicals. Consequently, it has been highly desirable to discover some practical method for forming films, filaments and the like that is not complicated by chemical modification, does not involve sacrifices in the properties of fabricated articles due to lowering substantially the degree of polymerization of the cellulose, or does not involve the consumption of other chemicals and the disposal of waste products thereof.

One method of forming shaped objects of cellulose of good quality which does not have the aforementioned disadvantages involves the formation of cellulose compositions, nonpourable at 25° C., comprising cellulose uniformly dispersed in a concentrated aqueous calcium thiocyanate solution, and then shaping the cellulose composition into a film, filament, or the like at elevated temperature under pressure, as described in detail in U. S. Patent No. 2,737,459, filed April 21, 1952, in the names of M. F. Bechtold and J. H. Werntz. Another method which has been proposed involves dispersing finely divided cellulose in an aqueous solution of a solvent metal salt in which solution the solvent salt is present in a concentration less than the minimum concentration which will dissolve cellulose, forming the dispersion into the desired shape, then evaporating water from the shaped dispersion at an elevated temperature until the cellulose particles are coalesced, and finally washing and drying the gel article. This latter method is described in greater detail in U. S. Patent No. 2,737,437, filed February 16, 1953, in the name of M. F. Bechtold. However, these processes, which are superior to the previously known methods for preparing cellulose fibers and films, require the premixing or compounding of the cellulose with large amounts of calcium thiocyanate or other solvent salt solutions.

Still another proposed method of forming shaped objects of cellulose involves forming an aqueous particulate dispersion of finely-divided cellulose containing a water-soluble polymeric dispersing agent, forming this dispersion into a film, filament, or the like, contacing the formed cellulose dispersion with a salt solution which is a solvent for the cellulose, to coalesce the cellulose particles, removing the shaped article from the coalescing salt solution before the article loses its shape, and finally washing it free of salts, as described in detail in U. S. Patent application Serial No. 322,161, filed November 22, 1952, now forfeited in the names of R. C. Houtz and J. H. Werntz. This method has certain advantages over other processes, but the products are contaminated with the polymeric dispersing agents, and in some applications polymeric contaminants are undesirable.

An object of the present invention is to provide a new and different process for forming cellulose into films, filaments, and other shaped articles. A further object is to provide such a process which avoids the above-mentioned disadvantages of heretofore known processes of preparing shaped articles of cellulose. Other objects will be apparent from the description of the invention given hereinafter.

The above objects are accomplished according to the present invention by forming into a shaped article such as a film or filament, an aqueous particulate dispersion of finely-divided cellulose, any dispersing agent present being monomeric, contacting the shaped article with a salt solution capable of dissolving the cellulose, until the finely-divided cellulose is coalesced, then removing the article from the salt solution before it loses its shape, and, finally, washing the article free of salt. Preferably, the article is immersed in a coagulating bath after contacting the salt solution and prior to the washing step as this improves the wet strength of the article before it is washed with water.

The term "particulate dispersion" is used herein in the normal and accepted meaning of the term when referring to polymer dispersions. That is, particulate polymer dispersions are suspensions of polymer particles in a medium that is not a solvent for the polymer at the temperature involved. Thus, particulate dispersions of polymer particles are fundamentally different from molecular dispersions of polymer particles, which latter dispersions are solutions.

The particulate cellulose dispersions used in the process of this invention can be prepared by uniformly mixing 1 to 7 parts, by weight, of finely-divided cellulose, including water-insoluble, low-substituted cellulose derivatives, having an average particle size of less than 300 microns in diameter, with 19 to 13 parts of water containing up to 20%, i. e., 0% to 20%, by weight, of the cellulose, of a monomeric dispersing agent dissolved therein. Preferably, the dispersions contain 1 to 2.5 parts of cellulose particles of average particle size less than 100 microns diameter, 10% to 15%, by weight of the cellulose, of the monomeric dispersing agent, and 9 to 7.5 parts of water. The mixing is conveniently carried out in conventional mixing equipment as, for example, a vessel equipped with a mechanical stirrer, a gear pump, or a ball mill at a temperature between about 30° C. and the freezing point of the dispersion. With the more concentrated dispersions a Banbury type mixer or a screw extruder can be used.

The particulate dispersion is formed into the desired shaped article, e. g., a film or filament, by extruding the dispersion by mechanical means or by the pressure of an inert gas through a die or spinneret of desired shape and size. The shaped article can be contacted with the solvent salt solution by immersing it immediately in a solvent salt bath. It is essential that the solvent salt solution be maintained at least at a temperature at which the solution is a solvent for the particular cellulose in question but, preferably, it is maintained below the temperature at which bubbles form in the shaped article to any appreciable extent due to the boiling of the water in the cellulose dispersion. Temperatures of 90° C. to 150° C. are operable in general, but it is preferred to keep the salt solution at about 105° C. to 110° C. Temperatures below 90° C. are not usually desirable except in the case of some cellulose derivatives relatively easily coalesced, because coalescence takes place unnecessarily slowly. Above 120° C. there is a tendency toward excessive bubble formation. The shaped article can be contacted with the solvent salt solution as an unsupported filament or film or, if desired, the article can be supported on a plate, belt, drum, or the like while it is being coalesced and washed.

The effect of the solvent salt solution on the shaped article is to coalesce the cellulose particles and convert the particulate dispersion to a gel. If left in contact with the salt solution indefinitely, the shaped article would lose its shape, but it can be removed from the salt solution, and is removed in the practice of this invention, after the cellulose particles are substantially coalesced and yet prior to losing its shape, at a point where it has sufficient strength to be washed. Since the shaped article is weak upon removing from the salt solution, it is preferred to immerse it in a coagulating bath before washing. This alternate step improves the wet strength of the article. The gel article need be immersed in the coagulating bath for only a relatively short time, the optimum time depending on the thickness of the film, filament, or the like, before washing out the neutral salt with water. Times ranging from one minute or even less to an hour or more are satisfactory.

In some cases it is advantageous to evaporate part of the water from the shaped dispersion prior to contacting it with the solvent salt coalescing bath in order to increase the strength of the shaped dispersion.

Another optional step which is beneficial in some cases is to pass the gel article after removal from the solvent salt solution but prior to immersion in the coagulating bath or washing, through heated calender rolls to complete the coalescene of the cellulose particles. Also, in the formation of filaments the gel filament after removal from the solvent salt solution can be drawn or stretched prior to immersion in the coagulating bath or washing to improve its physical properties.

After the gel article has been immersed in the coagulating bath for a length of time such that it does not weaken appreciably when transferred to water, determined by separate experiment for each filament diameter, or film thickness, or similar cross-sectional measurement, it is next washed in water until substantially free of salts or other material picked up from the solvent salt solution and/or coagulating baths. Three or four changes of water are usually sufficient to obtain washings free of neutral salts. The washed article is then dried at ordinary or moderately elevated temperatures, e. g., at temperatures of 25° C. to 50° C. and at 40% to 90% relative humidity, when unsoftened. It is convenient to remove excess liquid from gel films by pressing the film on a polished plate with a squeegee. The shrinkage of filaments or films on drying can be controlled by drying them under tension. The gel filament or films can be drawn at ordinary temperatures and then dried under tension to give higher tenacity products.

The following examples in which proportions are expressed in parts by weight and all processing steps are conducted at room temperatures (20° C. to 30° C.) unless otherwise stated, illustrate specific embodiments of the invention.

Example I

A particulate cellulose dispersion is prepared by mixing until uniform 27 parts of cellulose film regenerated from viscose and ground to pass through a 50-mesh screen with 73 parts of an aqueous solution containing 4.05 parts of octadecyldimethylamine acetate. This dispersion is spread in a uniform layer 3 to 4 mils in thickness on a glass plate and the coating is allowed to air-dry until about one-fourth of the water is evaporated. The dispersion supported by the plate is then immersed in a coalescing bath consisting of a 57% aqueous calcium thiocyanate solution maintained at a temperature of 107° C. for a period of time sufficient to form a clear rubbery gel film but not long enough to cause the film to lose its shape, an immersion time of about 6 minutes being sufficient. The supported coalesced film is cooled and immersed in a coagulating bath consisting of acetone for a period of 6 minutes to improve the handling properties of the gel film. The gel film is stripped from the supporting plate, washed free of salt and acetone by means of water, and air-dried between filter paper. The resulting film is cloudy.

Example II

An aqueous dispersion containing 25% of the ground cellophane of Example I is prepared by mixing 10 parts of the ground cellophane uniformly with 30 parts of an aqueous solution containing 1.5 parts of the sodium salt of the sulfate of technical lauryl alcohol. This dispersion is formed into a film in the same manner as described in Example I with the single exception that the coalescing bath is a 68% aqueous solution of lithium bromide maintained at 107° C. The resulting air-dried film is translucent.

Example III

The process of Example II is repeated with the single exception that the cellulose dispersion contains 1.5 parts of Ivory soap as a dispersing agent instead of the sodium salt of lauryl sulfate. The resulting air-dried film is also translucent and has about the same quality as the film of Example II.

Example IV

A dispersion is prepared by mixing uniformly 5 parts of a powdered, high viscosity, acid-treated commercial wood pulp with 26 parts of an aqueous solution containing 1 part of octadecyldimethylamine acetate. The dispersion is spread in a uniform layer about 3 to 4 mils thick on a glass plate and the dispersion allowed to partially air-dry before being immersed for 6 minutes in an aqueous 57% calcium thiocyanate solution at 107° C. After removal from the coalescing bath, the gel film supported on the glass plate is allowed to cool and then immersed for 6 minutes in acetone to coagulate the gel film. The resulting film obtained after washing free of acetone and salts and air-drying is translucent.

Example V

An aqueous dispersion containing 25% of particulate cellulose is prepared by mixing 5 parts of cellulose particles of less than 43 microns diameter (cellulose film regenerated from viscose and ground in a ball mill until a fraction is obtained which passes through a standard 325-mesh screen) with 15 parts of water at 0° C. The mixture is maintained at this low temperature to avoid substantial swelling of the cellulose. The dispersion is spread uniformly on a glass plate in a layer 3 mils thick, partially air-dried, and then immersed for 10 minutes in an aqueous 68% lithium bromide solution at 105° C. The hazy, coalesced film is immersed in water and washed free of bromide ions, then dried under tension on a polished metal plate. The resulting film is about 1.5 mils thick, has a high gloss on the plate side, and is translucent.

It will be understood that the above examples are merely illustrative and that the invention broadly comprises the preparation of shaped articles of cellulose by forming into a shaped article an aqueous particulate dispersion of finely-divided cellulose containing up to 20% of the weight of the cellulose of a monomeric dispersing agent, contacting said shaped article with a salt solution capable of dissolving the cellulose, until the finely-divided cellulose is coalesced, removing the article from the salt solution before it loses its shape, and then washing the article free of salt.

In general, any type of unsubstituted cellulose or water-insoluble, low-substituted cellulose, i. e., cellulose derivatives having at least 2.5 free hydroxyl groups per glucose unit, having an average particle size of less than 300 microns in diameter, can be used in the process of this invention. Cellulose particles having an average diameter of less than 100 microns are preferred as being more readily and uniformly coalesced and giving better products. Especially preferred for use in cellulose dispersions containing no dispersing agent are cellulose particles having an average diameter of less than 50 microns. Cellulose of the indicated particle size can be obtained by grinding cotton linters, wood pulp, regenerated cellulose films or filaments, and water-insoluble, low-substituted celluloses cold in a ball mill, in a micropulverizer, or in an attrition mill of the type known as a "Micronizer."

Although the present invention requires the use of finely-divided cellulose and there is no real lower limit on the range of particle size, particles of size less than one micron in diameter ordinarily would not be available and, hence, would not be used. Thus, the particle size of the cellulose ordinarily used in this invention is relatively great compared to the particle size of synthetic polymers made by emulsion polymerization and of rubber in rubber latices, where the polymer particles are of colloidal size.

The DP (degree of polymerization) of the cellulose is not a critical factor in the present invention but more satisfactory results, particularly in the strength of the shaped article, are obtained when using a cellulose, substituted or unsubstituted, having a DP of at least 150. Preferably, a cellulose having a DP of 150 to 1000 is used and it has been found that the optimum DP range is from approximately 400 to 800.

The DP values given above and throughout the specification are values of the degree of polymerization calculated as follows: The absolute viscosity of a solution of cellulose in cupri-ethylenediamine is determined by Tappi suggested method T–230 sm–46 (Paper Trade Journal, 124, 37–41 (1947)), the solution being prepared as described for the falling ball method, but the viscosity actually being determined in a Cannon-Fenske viscometer. From the observed absolute viscosity is calculated the intrinsic viscosity, $[\eta]$, and the degree of polymerization, DP, is calculated from $[\eta]$ by the following formula:

$$DP = [\eta]^{1.105} \times 118.4$$

The use of finely-divided chemically treated cellulose is advantageous in this invention and this is the preferred type. Such cellulose includes fibers and films regenerated from viscose or cellulose acetate, and water-insoluble derivatives of cellulose with monofunctional reactants, having a degree of polymerization of at least 150, e. g., methylcellulose, ethylcellulose, cyanoethylcellulose, cellulose acetate, and the like, having at least 2.5 free hydroxyl groups per glucose unit. Commercial wood pulps, commonly known as dissolving pulps, having a DP of about 300 to 1000 are well adapted for use in the process of this invention. Also, cotton linters or wood pulps which have been activated by contact with a solution of a strong acid, preferably a mineral acid, e. g., aqueous nitric, hydrochloric, or sulfuric acid, are very useful. Thus, acid-treated celluloses of the previously specified particle size having a DP of 300 to 1000 are especially preferred. A useful form of treated cellulose is that obtained by contacting cotton linters or wood pulp with a dilute solution of sulfuric acid in glacial acetic acid, the quantity of sulfuric acid in the solution amounting to approximately 1.5% by weight of the cellulose. The resultant active cellulose, which contains about 5% acetyl, can be used directly after washing free of acid, or it may be reacted with an alcoholic solution of an alkali such as potassium hydroxide to remove the acetate groups.

The particulate cellulose dispersions adapted for use in the instant process can include various modifiers, if desired, such as plasticizers, pigments, inert fillers, assorted polymers and copolymers, and the like. The dispersion can include finely-divided polymers or copolymers other than cellulose and these may be coalesced along with the cellulose particles, partly coalesced, or left essentially in the form of discrete particles, depending on the effect of the particular solvent salt solution used or on the particular polymer or copolymer selected. Finely-divided polymers that can be incorporated in the cellulose dispersions include N-alkoxymethyl polyamides, polystyrene, alkyd resins, copolymers of acrylonitrile and butadiene, and urea-formaldehyde resins. These polymers are preferably employed in the form of emulsions.

The operability of the instant process as contrasted to that disclosed in the aforementioned U. S. Patent No. 2,737,459, is in no way dependent on the presence of a solvent salt such as calcium thiocyanate in the particulate cellulose dispersion. The presence of a solvent salt in the dispersion is not excluded so long as the dispersion retains its character of being a particulate cellulose dispersion.

The monomeric dispersing agents, which are optional ingredients in the cellulose dispersions used in the process of this invention, can be any water-soluble agent of either the anionic or cationic type. They can be used over a wide range of concentrations, dispersions containing up to 20%, based on the weight of the cellulose, being satisfactory. Concentrations of 10% to 15% are especially useful in facilitating the forming of the dispersions into the desired shapes, e. g., filaments and films.

In addition to the specific dispersing agents mentioned in the examples, other anionic and cationic monomeric dispersing agents which are useful in the process of this invention include sulfonated fatty acids, long-chain alkyl sulfates, sulfonates of fatty acid amides, sodium hydrocarbon sulfonates, alkylated aryl sulfonates, substituted amides of long-chain alkyl phosphates, amino esters of long-chain fatty acids, and alkyl aryl quaternary ammonium salts. Many dispersing agents of these and other types are commercially available.

The solvent salt solutions useful in coalescing the shaped particulate cellulose dispersion in the process of this invention can be any of the concentrated salt solutions that are known to dissolve cellulose at elevated temperatures, e. g., 90° C. to 150° C. Concentrated aqueous solutions of neutral salts that form hydrates and have boiling points within a certain range, that have viscosities above a certain minimum, and have positive heats of dilution within certain limits, as defined by Williams in Manchester Memoirs, vol. LXV, No. 12, 1–14 (1921), are especially suitable and are preferred for use in this invention. If desired, the coalescing solutions can be composed of a mixture of such neutral salts or a mixture of a solvent salt with a nonsolvent salt in such proportions that the mixed solution meets the above-mentioned limiting properties.

Examples of aqueous salt solutions that are suitable as coalescing baths in the process of this invention include 50% to 82% aqueous solutions of calcium thiocyanate, lithium thiocyanate, sodium thiocyanate, zinc thiocyanate, lithium bromide, zinc bromide, calcium bromide, zinc chloride, calcium nitrate, cadmium iodide, and mixtures of such salts. Specific examples of such aqueous solvent salt solutions well adapted for use in the instant process are: 70% calcium nitrate, 57% calcium thiocyanate, 68% lithium bromide, and 50% zinc thiocyanate. In general, best results are obtained with salts of metals of Groups I and II of the Periodic Table with inorganic acids. Specific examples of aqueous solutions of mixtures of solvent and nonsolvent salts which are useful coalescing baths include aqueous solutions containing 28% calcium thiocyanate and 28% calcium chloride, and 20% calcium thiocyanate and 40% calcium chloride.

In addition to aqueous solutions of these neutral salts, concentracted solutions of such salts in organic solvents such as methanol and ethylene glycol are also useful as solvent salt baths for coalescing the cellulose particles in the process of this invention. Specific examples are: methanol solutions containing 70% calcium nitrate tetrahydrate, 60% sodium thiocyanate, and 75% ammonium thiocyanate; and ethylene glycol solutions containing 65% cadmium iodide and 60% zinc bromide. In addition, aqueous solutions of combinations of inorganic salts with certain organic compounds also form useful solvent salt solutions. For example, aqueous solutions containing 65% sodium thiocyanate and 12% dicyandiamide, and 60% calcium chloride and 6% sucrose, are operable in this process.

Aqueous solutions containing 51% to 75% calcium thiocyanate, 75% calcium bromide, 80% zince chloride, 82% zinc bromide, 60% lithium thiocyanate, and a mixture of 28% calcium thiocyanate with 28% calcium bromide, and methanol solutions containing 70% lithium bromide and 75% calcium bromide, are especially preferred for use in the present invention since they produce films of the best clarity. Of these preferred salt solutions, 70% lithium bromide in methanol gives films of the greatest strength.

Various types of coagulating baths can be used to improve the properties of the gel structures. Examples of suitable coagulating baths include aqueous salt solutions such as, for example, 25% sodium chloride, 25% calcium chloride, 35% magnesium chloride, 50% sodium formate, 30% sodium acetate, 25% ammonium chloride, 50% ammonium nitrate, 30% lithium bromide, and other baths such as 50% aqueous glycerol, 50% aqueous acetic acid, absolute alcohol, 2B denatured alcohol, glycerol, methanol, and acetone. One of the preferred coagulating baths is 25% aqueous sodium chloride since it forms films of greater clarity and strength than many of the others. If calcium thiocyanate solution is employed as the coalescing bath, sodium chloride is especially preferred as a coagulating bath since calcium thiocyanate can be recovered easily from solutions containing these two salts. Acetone is another preferred coagulating bath since it also gives fibers and filaments of greater clarity and strength than many of the others.

The cellulose gel films or filaments, prior to the final drying step, can be impregnated with softeners, plasticizers, polymers, or dyes by immersing the gel film or filament in an aqueous solution of the desired softener or other modifier.

The present invention avoids serious difficulties which are inherent with the previously known methods of preparing shaped articles from cellulose compositions of various types. One of the disadvantages of one of the prior art methods is that the high temperature or prolonged periods used for dissolving the cellulose in concentrated salt solutions caused considerable degration of the cellulose. Consequently, the molecular weight or degree of polymerization of the cellulose in the final shaped article was too low to provide articles of acceptable strength. The processes of the aforementioned Patent No. 2,737,459 of Bechtold and Werntz, forfeited application Serial No. 322,161 of Houtz and Werntz, and Patent No. 2,737,437 of Bechtold, do not possess such disadvantages since they reduce the time of exposure of cellulose to hot salt solutions. However, the process of the present invention provides advantages over each of these other proposed methods. The present process provides a further reduction in the time of exposure of cellulose to hot solvent salt solutions beyond that provided by the methods described in the Bechtold and Werntz and Bechtold applications. It also avoids working with highly viscous gums, which are difficult to handle, and the use of pressure in the coalescence of the shaped articles as required by the process of Bechtold and Werntz. The process of this invention offers an economic advantage over that of Houtz and Werntz, since a process requiring no dispersing agent is cheaper than one requiring any dispersing agent and there is no contamination of the product. Furthermore, monomeric dispersing agents are more readily removed from the final product, e. g., by washing, than polymeric dispersing agents.

In addition to their use in the formation of shaped articles such as films and filaments, the cellulose dispersions can be converted by the process of this invention to sponges or coatings applied on various substrates as a finish, or coated on fabrics.

As many apparently widely different embodiments of this invention may be made without departing from the spirit and scope thereof, it is to be understood that the invention is not limited to the specific embodiments thereof except as defined in the appended claims.

The invention claimed is:

1. The process for preparing a shaped cellulose article which comprises shaping the article from an aqueous particulate dispersion essentially consisting of 1 to 7 parts of finely divided cellulose, having an average particle size of less than 300 microns in diameter and a DP value of at least 150, dispersed in 19 to 13 parts of water containing 0% to 20%, by weight of the cellulose, of a monomeric dispersing agent dissolved therein, coalescing the shaped cellulose-in-water dispersion by contact with a concentrated solution of a metal salt at a temperature of 90° to 150° C. capable of dissolving said cellulose until the cellulose particles are substantially coalesced and the dispersion is converted to a gel, said coalescing treatment being discontinued before said article loses its shape, washing the shaped article free of salt, and thereafter drying the article so produced.

2. Process as set forth in claim 1 wherein said shaped gel is immersed in a coagulating bath after contacting said salt solution and prior to said washing step.

3. Process as set forth in claim 2 wherein said finely-divided cellulose has an average particle size of less than 100 microns in diameter.

4. Process as set forth in claim 1 wherein said finely-divided cellulose is acid-treated cellulose having a DP of 300 to 1000.

5. Process as set forth in claim 1 wherein said aqueous particulate dispersion of finely-divided cellulose comprises 1 to 2.5 parts, by weight, of finely-divided cellulose having an average particle size of less than 50 microns in diameter and a DP of 400 to 800, dispersed in 9 to 7.5 parts, by weight, of water containing 10% to 15%, by weight of said cellulose, of a monomeric dispersing agent dissolved therein.

6. Process as set forth in claim 5 wherein part of the water is evaporated from said shaped dispersion prior to contacting said shaped dispersion with said salt solution.

References Cited in the file of this patent
UNITED STATES PATENTS

| | | |
|---|---|---|
| 113,454 | Schmidt | Apr. 4, 1871 |
| 217,448 | Coortenay | July 15, 1879 |
| 2,737,437 | Bechtold | Mar. 6, 1956 |